United States Patent [19]

Jennings, Jr. et al.

[11] Patent Number: 5,542,088
[45] Date of Patent: Jul. 30, 1996

[54] METHOD AND APPARATUS FOR ENABLING CONTROL OF TASK EXECUTION

[75] Inventors: Ralph E. Jennings, Jr.; Benjamin P. Haley, Jr., both of Madison; R. D. Holland, Somerville; Deborah K. Cecil; Anthony E. Tassone, both of Madison, all of Ala.

[73] Assignee: Intergraph Corporation, Huntsville, Ala.

[21] Appl. No.: 235,595

[22] Filed: Apr. 29, 1994

[51] Int. Cl.⁶ .................................................. G06F 9/46
[52] U.S. Cl. .................................. 395/650; 364/DIG. 1; 364/281.7; 364/281.8
[58] Field of Search ............................................. 395/650

[56] References Cited

U.S. PATENT DOCUMENTS 4,553,202 11/1985 Trufyn ............................. 364/DIG. 1
5,371,887 12/1994 Yoshida et al. ......................... 395/650
5,394,547 2/1995 Correnti et al. ........................ 395/650

*Primary Examiner*—Thomas M. Heckler
*Attorney, Agent, or Firm*—Townsend and Townsend and Crew LLP

[57] ABSTRACT

A system is disclosed which enables a user of a computer system to have direct control over the priorities assigned to the execution of tasks requested by the user. The user establishes a user tolerance level indicative of the delay the user is willing to tolerate before a task is assigned to background manager. Then whenever a task is requested by the user, a calculation is made to determine whether the task will require more or less time than the user tolerance. If the task requires more time, it is assigned to the control of a background manager, while if it requires less time, it is executed to completion immediately without further instruction from the user. The background manager handles the execution of all background tasks, maintaining the proper order for data consistency, yet allowing the user to rearrange execution priorities when necessary.

33 Claims, 14 Drawing Sheets

| | Background Manager | | |
|---|---|---|---|
| | Task | Document | % Complete |
| Q | Other Queue | | |
| | Sharpen/Soften | FLOWERS.TIF | 76 |
| | Gradation | FLOWERS.TIF | 0 |
| | Save | FIELD.TIF | 0 |

FIGURE 4

Background Manager

- Suspend
- Resume
- Suspend All
- Undo Suspend All
- Abort

- Task Info
- Options...
- Log...
- Queues ▶

- Help...

- Move
- Close

| ument | % Complete |
|---|---|
| EAHAT.IGR | 0 |

FIGURE 5

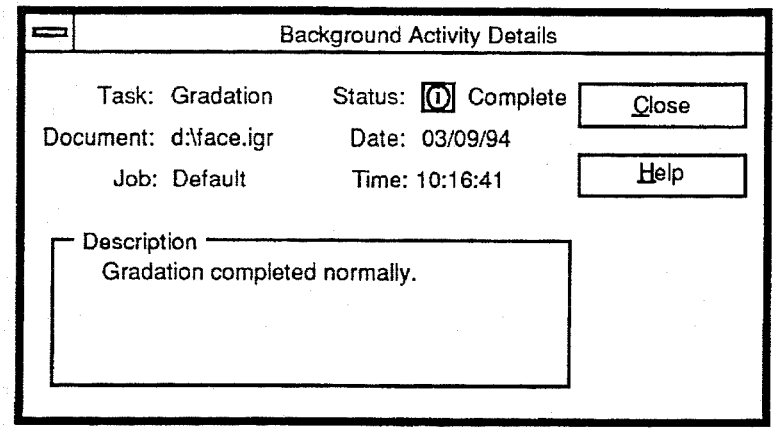
FIGURE 8
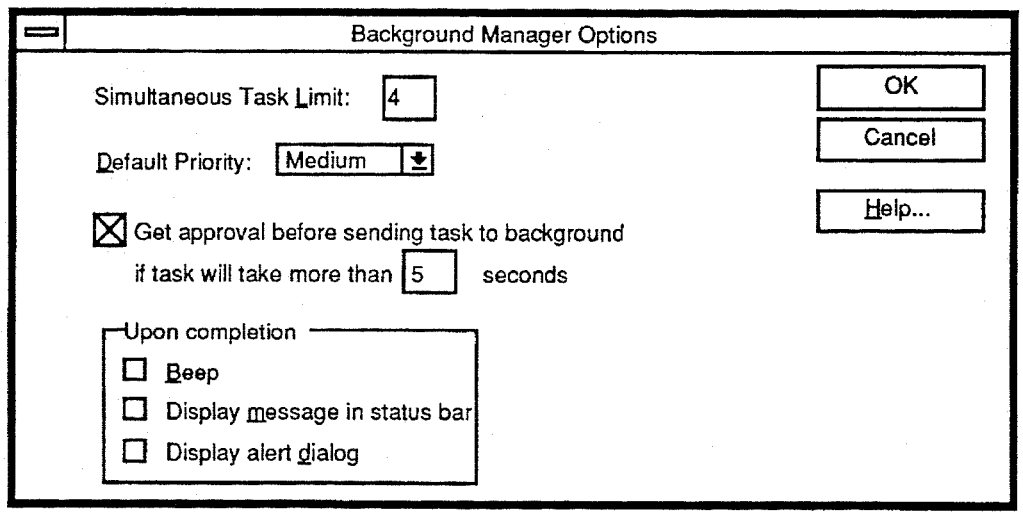
FIGURE 8A
FIGURE 8B

METHOD AND APPARATUS FOR ENABLING CONTROL OF TASK EXECUTION

BACKGROUND OF THE INVENTION

The computer systems of today and tomorrow are challenging software developers to invent new paradigms for presenting applications to the users of their products. The challenge lies in harnessing the raw horsepower of the computer architecture and the new features of the system software in ways that significantly increase the productivity of the user and the work accomplished through the software application. Another challenge is to produce applications which will automatically increase in performance and throughput with introduced computer innovations without significant re-design of those applications.

In the typical prior art system the user has little or no control of the manner in which the computer system executes the user's application programs. One typical example of the lack of direct control over application program execution is the Microsoft Windows™ operating system. In that system when multiple application programs are running in enhanced mode under control of a 386 or 486 microprocessor, the user can set the minimum number of milliseconds that an application can run before the system gives control to another application. Frequent switching makes running a series of applications in an apparent multitasking situation appear smoother. Unfortunately the overall effect on system operation is to noticeably slow the performance of the application primarily in use. The user has no specific way of reconfiguring system operation to slow or speed the performance of any particular task, and no way of informing the system that a particular task can run in the background at any particular performance level.

This and other systems employ the traditional approach to the design of interactive software applications based on processing the user's request immediately and occupying the computer resource until the request is completed. This approach, however, is not well-suited for a typical user. Typically a user operates a computer system by a process of (1) thinking about the next task, (2) deciding what to do, (3) informing the computer about the decision using some form of input device, and (4) waiting while the computer processes the task. Then, these four steps are repeated for the next task. This simple sequence of steps is shown in FIG. 1. Steps 1, 2, and 3 are often accomplished while viewing the graphical user interface (GUI) of the application. If the GUI is not available to the user during step 4, then user time is wasted while waiting for the computer to finish processing the current task. We have developed a system which overcomes this disadvantage of prior art systems.

SUMMARY OF THE INVENTION

We have developed an approach to designing and presenting a software application in a manner that allows the user to interact with the application regardless of tasks and progress. To achieve this we provide a user tolerance time interval which reflects the user's willingness to wait for the execution of the given command while using an application program. If a command cannot be completed within the time specified by the user tolerance, a dialog box is presented to the user to allow the user to choose whether to cancel the operation, or place the operation under control of a background manager. If the user chooses to cancel the operation, then an undo is performed, and control over the system is returned to the user. On the other hand, if the user chooses to assign the task to the background manager, then the user is returned to the application, and the previous user-specified task is thereafter controlled by the background manager. The background manager assigns the task to a task list, over which the user also has control. The process by which a new task is executed and all needed data is updated is complex. Tasks are promoted to execution state in first-in-first-out (FIFO) order within a specific priority with higher priority tasks being given preferential treatment in reaching execution state. Tasks which depend upon other tasks to complete are not allowed to move into execution state until the prerequisite tasks complete. Furthermore, a task cannot actually move into execution state unless there is an available slot open for execution (there is a user configurable number of tasks that are allowed to be executing concurrently). Also, task priorities are allowed to be changed by the user which can cause a task to move higher in the list to begin execution. If there are no available open slots and a non-blocked and non-executing task moves to a higher priority than a currently executing task, that task will be suspended and the higher priority task will be allowed to execute in its place. While a task is being operated on in the background, the data used by that task is locked and precluded from being changed in defined ways by other tasks.

In one embodiment of our system, a method of enabling a user of a computer system to control the execution of tasks by an application program on the system includes a step of establishing for the application program a user tolerance level. Whenever the user requests the system to perform a task, a calculation is made of the estimate of the time the task will require to be completed. If the estimate is shorter than the user tolerance level, the task is performed to completion. On the other hand, if the estimate is greater than the user tolerance level, the user is allowed to assign the task to the background manager, and control of the system is returned to the user for selection of the next task.

BRIEF DESCRIPTION OF THE DRAWINGS

FIGS. 2–8 illustrate the user interface, with

FIG. 2 illustrating the to-background dialog box,

FIG. 3 illustrating an alternate-to-background dialog box,

FIG. 4 illustrating the background manager dialog box,

FIG. 5 illustrating the background manager menu selections,

FIG. 6 illustrating a detailed view for a task,

FIG. 7 illustrating the activity log dialog box, and

FIG. 8 illustrating the detailed activity log for a task;

FIG. 8a illustrates the background manager options dialog box;

FIG. 8b illustrates the main palette of all tasks assigned to a queue;

DESCRIPTION OF THE SPECIFIC EMBODIMENTS

Overall System Description

Figure 1:
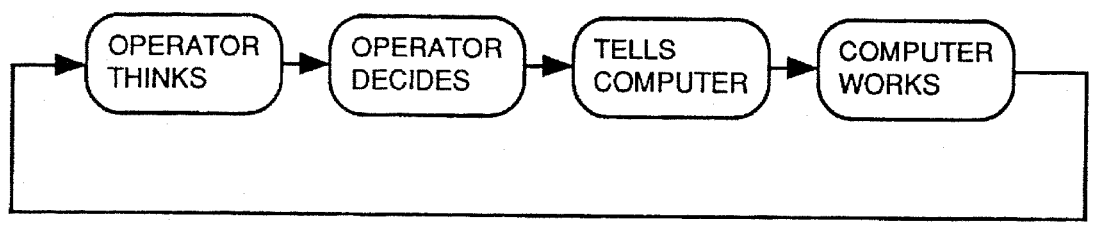
FIG. 1 illustrates typical operation of a prior art computer system.

A short glossary is provided in a section entitled "Definitions" at the end of this section. As described above, FIG. 1 illustrates the operation of a conventional computer system. In contrast to that mode of operation, consider the advantage if the computer worked on accomplishing the current task while steps 1–3 are being performed by the user for the next task. In other words, consider the benefit if the software application is striving to let the user work at the user's own pace, and is not artificially limited to the pace of the computer.

Of course in many cases a user cannot "think/decide/tell" until the results of the previous task are complete. In some instances, however, the user could "think/decide/tell" the computer about another unrelated task while the current task is processing. Such instances are especially common in applications involving processing large amounts of data, for example operations involving large databases or graphics or image processing.

The importance of our system will depend heavily on the type of user employing the computer system. For the casual user of a software application delays are not vitally important. For the serious production user that constantly uses an application to produce results, any boost in productivity is important. First, consider the value of the user's time. The productivity of the user, i.e., the work accomplished by the user with a given software application, is proportional to the value of that user's time. In other words, the more work the user squeezes out of the computer, the more return the user (and his or her employer) gets on that user's time and investment in the computer. Intelligent consumers are therefore more concerned than ever about the total throughput of a system. Thus important attributes for a computer system are the appreciation that user time is important and costly; lengthy operations are typical; and multiple jobs are always in progress.

We have developed an approach to designing and presenting a software application in a manner that allows the user to always interact with the application regardless of tasks in progress. We term this approach user controllable concurrent functionality, or usable concurrent functionality (UCF). Concurrency is an attribute of a software design that allows an application to execute independently in two or more code locations. Multi-tasking operating systems allow concurrency among individual processes, typically programs. The newest modern operating systems (such as Windows NT or OS/2) are symmetric multiprocessing (SMP) and allow individual programs to be made up of threads. A thread is a unit of code in an application that can proceed independently of other threads. A properly threaded application can achieve benefit for a user on a single-processor computer. Properly threaded applications, however, perform even better on an SMP computer. The concepts we describe herein are not restricted to SMP computer architectures and operating systems, although an SMP architecture is the preferred hardware for UCF. Also, although an SMP operating system with threads is a convenient environment in which to implement UCF, UCF can be implemented under any multi-tasking operating system (such as UNIX) by replacing threads with forked sub-processes. These sub-processes can communicate data and control with the main process via shared memory.

Figure 2:
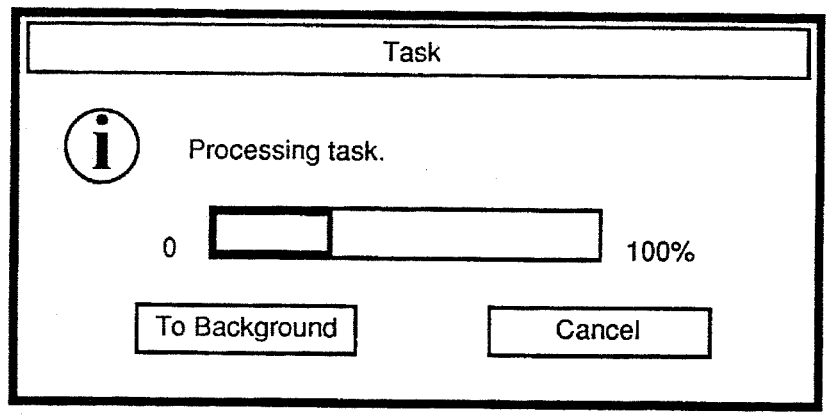

Central to user controllable concurrent functionality is a time interval known as the user tolerance. The default value for user tolerance is 5 seconds, although preferably it appears as a preference in the application's GUI and can be easily reset by the user. Any command initiated that is estimated to require more than the user tolerance for completion will display quickly a dialog box on the monitor of the computer system. This dialog box shows the current status of the command, preferably by a bar chart showing the percentage complete. The dialog box also preferably contains two buttons: Cancel and To Background. FIG. 2 shows the dialog box presented when a task is estimated to exceed the user tolerance time limit. Note that this dialog box provides the user with the option of sending the task, which will require a time to complete which exceeds the user tolerance, to the background.

The Cancel button allows the user to abort the command (with full cleanup of any partially accomplished results) for all operations for which it is feasible to implement such a cancellation feature. (The majority of application commands support cancellation). The To Background button takes the currently executing command and pushes it to the background. This button is the default button on the dialog box, i.e. allows the user to push the command to the background by pressing the Enter key. In one embodiment a preference is available that enables all such commands to be automatically pushed to the background without explicit user action on a command-by-command basis. Once a command has been pushed to the background, the user is free to continue to work with the application. The data which is being operated on in the background, is locked until the command is complete. As described further below, however, users are able to access locked data when appropriate.

Figure 3:
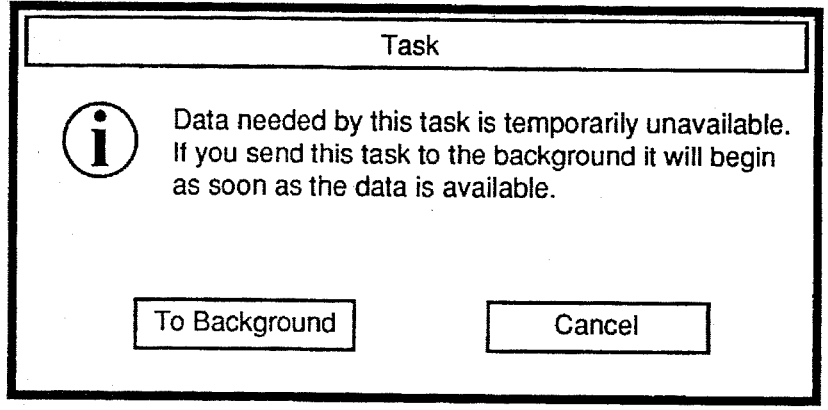

The menus of the application reflect the legitimate operations that can be performed on a piece of data (an element) with executing or pending background tasks already specified. In many cases, a foreground task can be pushed to the background even when there are currently executing or pending tasks on an element. Therefore, some background tasks are queued to begin after completion of others. To provide additional security, in some cases code is locked in addition to data. This allows externally developed software not known to be thread-safe to be used in our system. FIG. 3 is an alternate dialog box shown when the current task could not start immediately. This dialog box is employed when the data needed by the users chosen task is unavailable because the data is locked.

To define the types of tasks which are legitimate on locked data, we characterize all tasks to be performed as one of five types of tasks:

(1) Immediate read. The data is used in read only mode and access to the data is part of the GUI of the command.

(2) Deferred read. The data is used read only and is not accessed during the GUI of the command.

(3) Deferred write. The GUI specifies a change to the data without referencing the actual data. Processing the data is initiated automatically or by the user choosing an OK button from a dialog box.

(4) Deferred write with GUI read. The GUI specifies a change to the data and references the actual data during the GUI, for example, by providing a visual simulation of the results of the command. Processing of the data is initiated by selecting an OK button from a dialog box.

(5) Immediate write. The data is directly written during the command's GUI, for example a paint command.

Examples of tasks of each of the above types of tasks which are legitimate on locked data are described below. In the above definitions, data refers to any entity that is perceived and interacted with by the user, for example, graphical elements, files on disk, etc. The rules we employ to dictate legitimate tasks on locked data include:

(1) When no background tasks are defined, any task can be initiated.

(2) When an immediate read or deferred read task is pending, then any type of task other than an immediate write can be initiated. Write tasks are queued to begin only after the immediate read or deferred read completes. Read tasks are allowed to operate concurrently with the pending immediate read or deferred read task.

(3) When any form of a write task is pending, then a deferred read or a deferred write task can be initiated (and will be queued to begin only after the pending write task completed.) In some cases, a deferred write with GUI read command is "demoted" (see note below) to a deferred write command (with the GUI read aspect of the task disabled) and also allowed to be initiated.

Note: In some cases the GUI read aspect of a deferred write with GUI read task is an optional added benefit to the user. In these cases, this type of task can be demoted to an ordinary deferred write task (with all GUI read aspects of the task disabled to the user). Such feature-disabled tasks am intuitively flagged to the user with a visual indicator in the user interface of a product. Therefore, the number of tasks which can be initiated when any form of write task is pending is increased allowing the user more opportunity to work ahead of the application. Certain classes of tasks are known to be a heavy burden on the computer. To avoid overloading the system we assign classes of tasks which can be executing concurrently. These classes of tasks are controlled by queues which contain separate properties from the ordinary tasks controlled by the primary background manager. Queues have a separate number of tasks which are allowed to execute concurrently and a separate set of default behaviors (priorities, completion alarm options, etc.). The number of concurrent tasks within the queue is an additional limit to the total number of concurrent tasks. Example: Four tasks may execute but only two of those tasks may be in Queue 1. we also give queues properties which can be configured by the user to allow more than one task in a queue to execute concurrently.

Having described pushing tasks to the background, next we describe how the user interacts with background tasks and controls the application. In the preferred embodiment control is provided with a Background Manager command. This command displays a dialog box (implemented as a persistent dialog called a palette) which shows in a scrolling list all currently executing or pending tasks and queues. FIG. 4 shows the main background manager dialog box. This dialog box shows the status of all tasks presently under control of the background manager for execution. The information shown on this dialog is constantly updated while the dialog is displayed. Optionally, this dialog box can be dismissed by the user. The purpose of this dialog is to show the user the state of the system. The background manager dialog tells the user everything about what is going on in the application. Included in the scrolling list of tasks and queues is the status of the task, the name of the task (the command which the user chose), a description of the data accessed by the task (file name, document name, optional thumbnail display of the data, etc.), and the percentage complete. To allow system tuning, a preference is provided which allows the user to restrict the number of tasks which are allowed to execute concurrently. The various states that a task can be in, and which are shown in the status field of the dialog box are:

(1) Processing—the task is currently executing.

(2) Ready—the task is ready to begin execution (it is not blocked by any prerequisite task) but has not yet started (e.g., there are too many tasks already executing).

(3) Waiting—the task is blocked by another task (it is queued to begin only after a prerequisite task completes).

(4) Aborting—the task received an abort but has not yet started cleaning up.

(5) Cleaning up—the task is cleaning up from the abort request.

(6) Completed—the task completed and will be removed from the background manager dialog on the next refresh.

FIG. 5 shows the pulldown menu for controlling the background manager and the specific tasks to be performed. Controls are provided by the background manager to control the workload of the workstation. In particular, options are available allowing:

(1) A task to be suspended. Execution of the task stops and waits for a resume or abort.

(2) A task to be resumed.

(3) A task to be aborted with full cleanup if applicable.

(4) All tasks to be paused. The execution of all tasks stop and wait for a resume or abort action to be initiated.

(5) All currently paused tasks to resume processing, with previously suspended tasks remaining suspended.

(6) A queue to be paused.

(7) A currently paused queue to be resumed.

Figure 6:
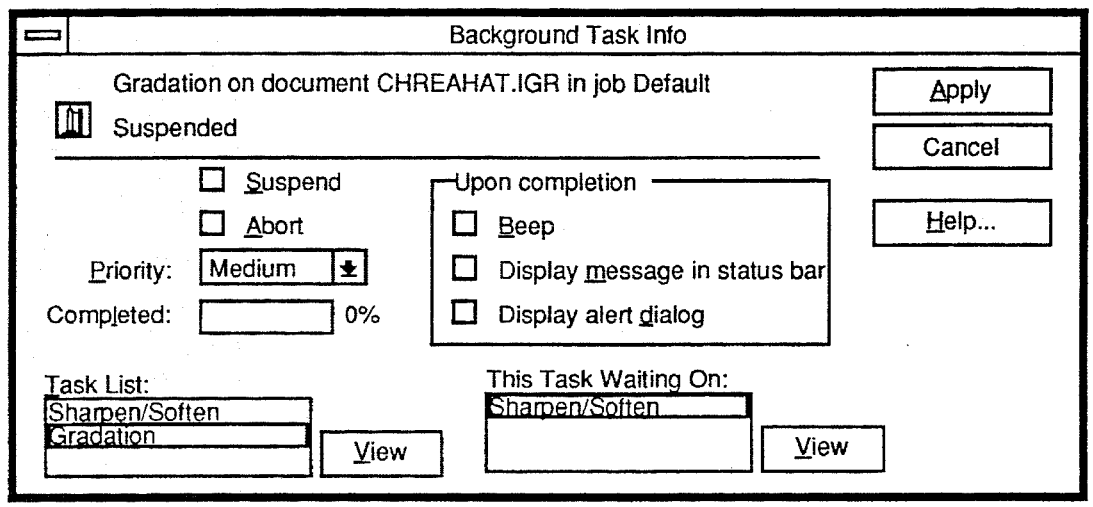

In addition, a detailed view of any particular task can be displayed allowing more information and controls for the task. FIG. 6 shows the detailed view dialog box for a particular task. This dialog box appears when one of the tasks in the background manager task list is chosen. Note that the task, its status, data upon which it is dependent, the percentage completion, and other specific information about the task are all shown. The most important piece of additional information on the detailed view dialog is a list of all tasks which are blocking this task (if any). A choice can be made so that the user is notified when the task completes (by a beep, a message displayed in the status bar, and/or a display alert dialog box). Lastly, the priority of the task can be established/changed. The number and level of priorities can vary from one implementation of UCF to another. The current set of standard priorities in the preferred embodiment are labeled Very High, High, Medium, Low, and Very Low. In addition, two special priorities are available: Exclusive (meaning this task is the only background task allowed to run) and Intermittent (meaning this task only runs if no other background tasks are also running).

All of the background manager controls allow the user to regulate the execution of the tasks on the computer. Rush jobs can be accommodated with suspend/resume/abort features as well as priority setting. The background manager intuitively constrains the user from getting queued tasks out the correct order by using these controls. Tasks queued to operate on a piece of data must complete in the order they are submitted to assure the desired result. Independent tasks (not tied to the same piece of data) can complete in any order.

Figure 7:
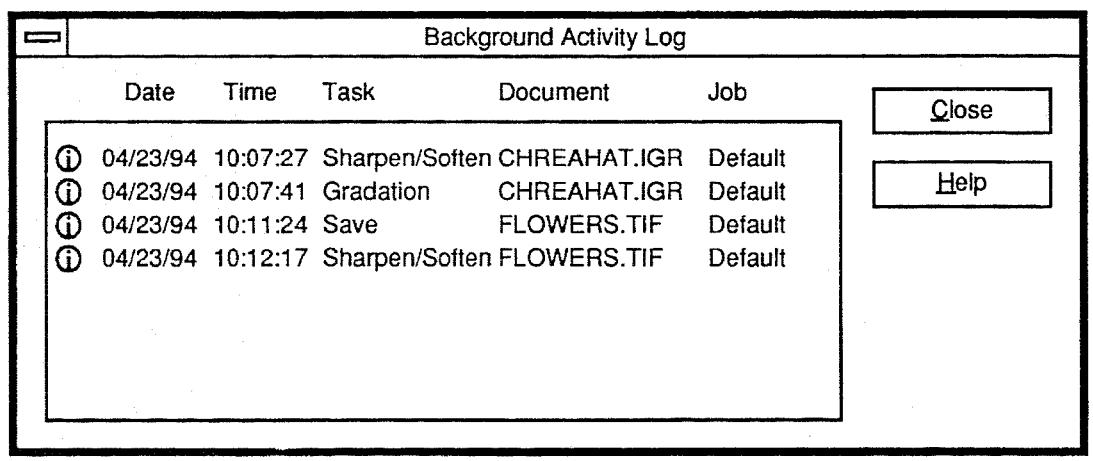

Another aspect of the background manager is that of an activity log. FIG. 7 shows the background manager activity log. The log shows the date and time each task was sent to the background, as well as the task name and file name. Tasks are able to post information to an activity log in the background manager. The most common information posted is related to errors encountered in processing. The user can view a list of all activity log entries and can activate a detailed activity log for a particular task. In this way, a user can determine any information that a background task needed to convey during processing. FIG. 8 shows the detailed activity log for a task. The log includes a statement describing the completion of the task.

A dialog box is provided from the background manager dialog to set options for the system. FIG. 8a illustrates the background manager options dialog box. This allows the user to set the total number of tasks which may execute simultaneously, the user tolerance (time limit), and whether or not the user must approve sending tasks to the background. This dialog also allows the user to specify the default priority and completion alarms for tasks which are not sent to a specific queue.

Figure 8C:
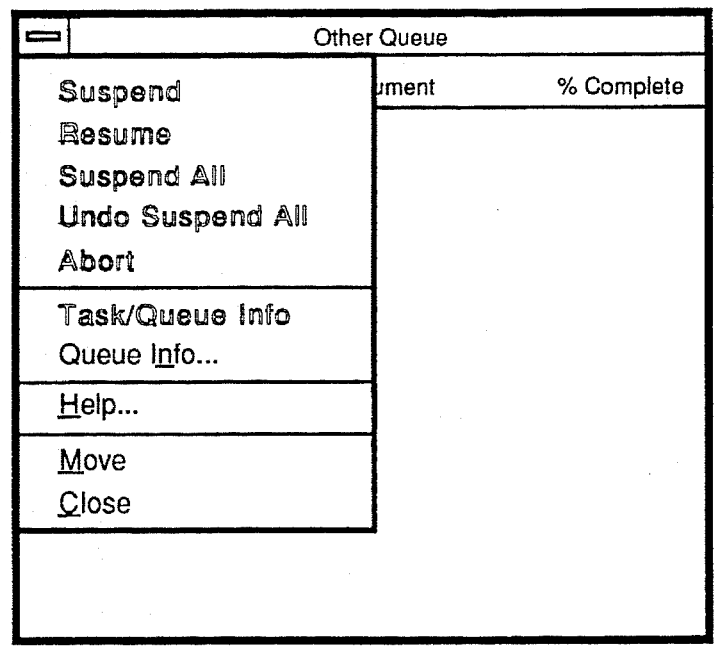
FIG. 8c illustrates the menu options available from the main queue palette of FIG. 8b.
Figure 8D:
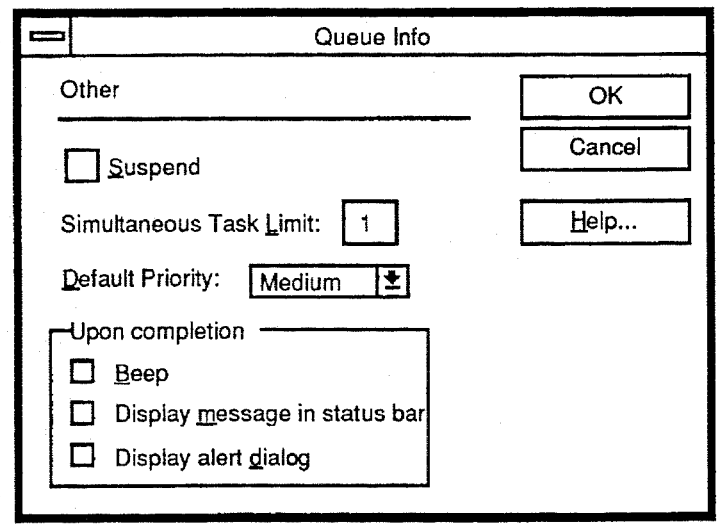
FIG. 8d illustrates the queue information options dialog box.

A dialog is provided from each queue dialog to set options for tasks in that queue. FIG. 8b illustrates the main palette of all tasks assigned to a queue. In the example, the queue has been suspended as shown by the title bar. This palette is the queue equivalent to FIG. 4. FIG. 8c illustrates the menu options available from the main queue palette of FIG. 8b. This is the queue equivalent to FIG. 5. FIG. 8d illustrates the queue information options dialog box. The user may suspend the queue and set the maximum number of simultaneous tasks within that queue. The user also specifies the default priority and completion alarms for tasks assigned to that queue.

One issue which can arise is what to do when a user attempts to exit the application while background tasks are still executing. In the preferred embodiment the application collapses to a special icon on the desktop that depicts processing is still in progress. When the last task completes, the icon changes appearance to notify the user that all tasks are complete. The activity log is still available to retrieve any status information about tasks which have completed since the time of the exit. Care must also be taken for situations where the user attempts to shutdown the workstation while background tasks are still running. In the preferred embodiment a strong warning is issued that data could be corrupted by proceeding with the shutdown.

The Background Manager

Overview

Figure 9:
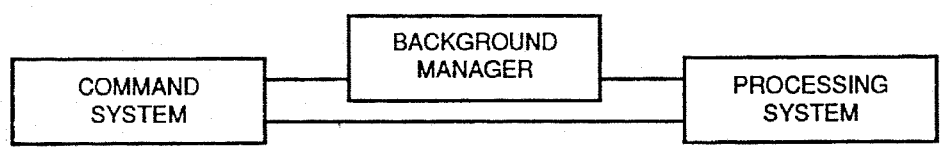
FIG. 9 illustrates the overall operation of the background manager in conjunction with the command system and processing system.

FIG. 9 illustrates the overall relationship between the background manager and the computer system. Essentially the background manager "sits" between the command portion of the system and the processing system. The background manager intercepts commands and determines which are appropriate for background execution and which are not. This is described in greater detail below. The command subsystem and processing subsystem work together to process data (elements) or other information. The background manager allows the commands to submit actions and continue processing without waiting for the actions to complete. The commands hand off actions to the background manager. The background manager works with the processing subsystem to perform the actions. When the action completes, the background manager notifies the command subsystem. The processing subsystem is unaware of which subsystem drives it. The processing subsystem performs the same way in background mode as in foreground. The command decides whether to force foreground execution, force background execution, or allow the background manager to decide between foreground and background execution (based on the user tolerance time limit).

The background manager subsystem interacts with the user, the command subsystem and the processing subsystem to coordinate multiple simultaneous actions on elements. Each action contains one or more threads and one or more elements upon which the threads operate. Each element has a lock that determines whether other actions may access the elements simultaneously. Jobs accumulate processing information from actions for an optional job accounting system. A dialog box adds and deletes jobs. This dialog box also changes the default priority of actions associated with a job.

The background manager limits how many actions may be active at any time. The command system initiates actions, suspends and resumes all actions, and displays or hides the background manager's dialog boxes. Two dialogues control executing actions. The first dialog displays summary information about all actions currently executing or queued including a description of the action, the priority, percentage complete and execution status. The second dialog displays further details about a specific action including job, elements involved and the reason an action cannot process. The summary dialog allows the user to suspend, resume and cancel (unless otherwise prohibited) an action. The detail dialog allows the user to change the priority of an action. These dialogues periodically query the actions to update themselves. A log dialog allows the user to view completed actions with filters to specify jobs and completion status. Each completing action updates the log dialog. The log dialog records each update in a file.

Background Manager Design

Figure 10:
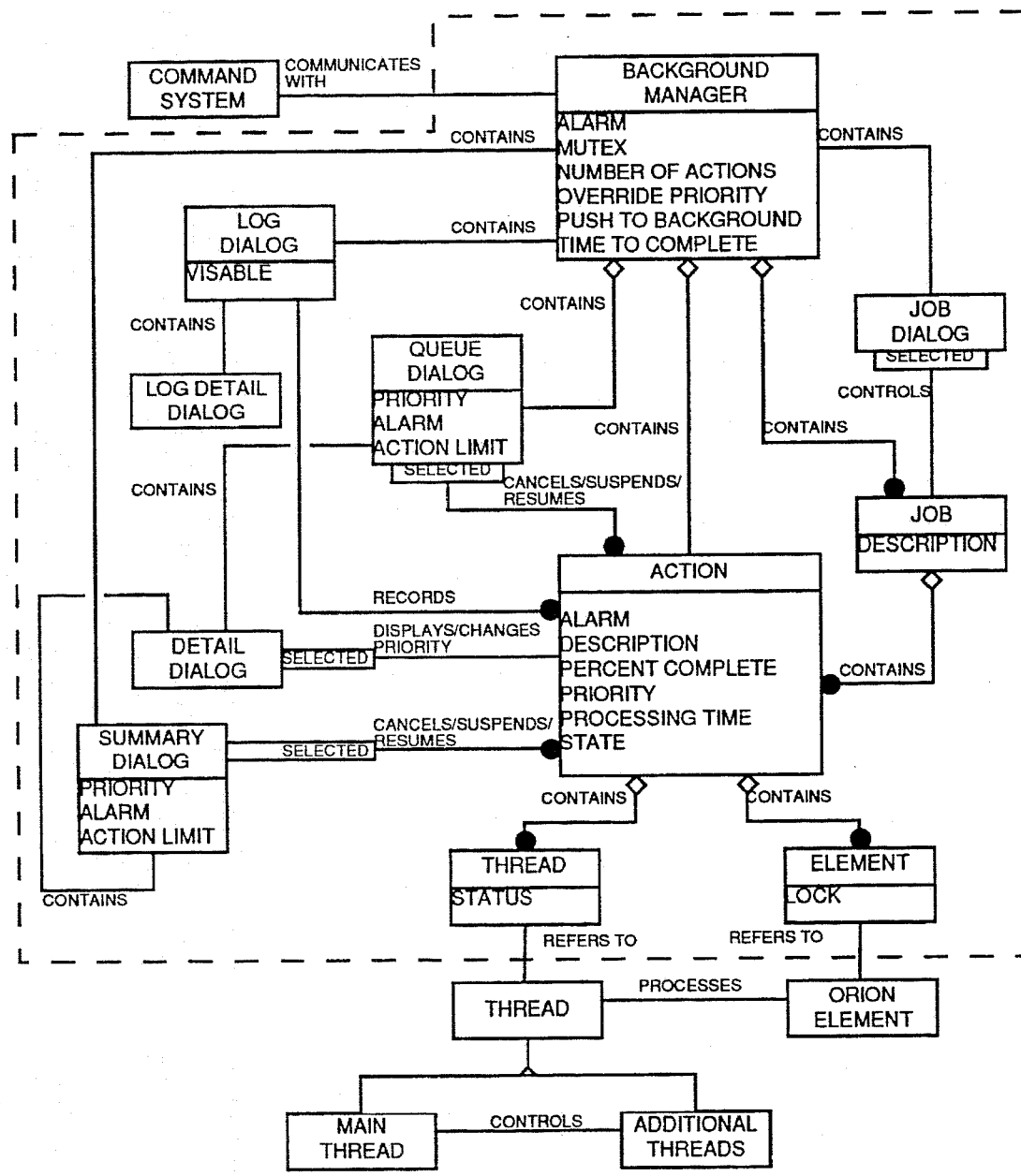
FIG. 10 is an object diagram of the background manager.

FIG. 10 is a diagram for some of the nontrivial classes of objects of the implementation of the background manager. This is an object diagram as described in *Object-Oriented Modeling and Design* by James Rumbaugh, Michael Blaha, William Premerlani, Frederick Eddy and William Lorensen, 1991, Prentice-Hall, Inc., Englewood Cliffs, N.J. The more important aspects of the objects are discussed below.

Locking Elements. Each action has a list of affected elements. The list implies a lock on those elements. All following actions consider each element for that action locked. The command subsystem specifies the type of lock for each element. Elements used for input only can specify a read lock. Elements changed by the action must be write locked. This scheme locks elements when the action is created.

When the background manager creates an action, the action may not own the elements. The background manager activates the action when no previous actions own the required elements. This locking scheme guarantees that no later action can overrun the lock as long as the background manager creates only one action at a time. The queue management component of the background manager guarantees that an action owns its elements before processing starts.

Figure 11:
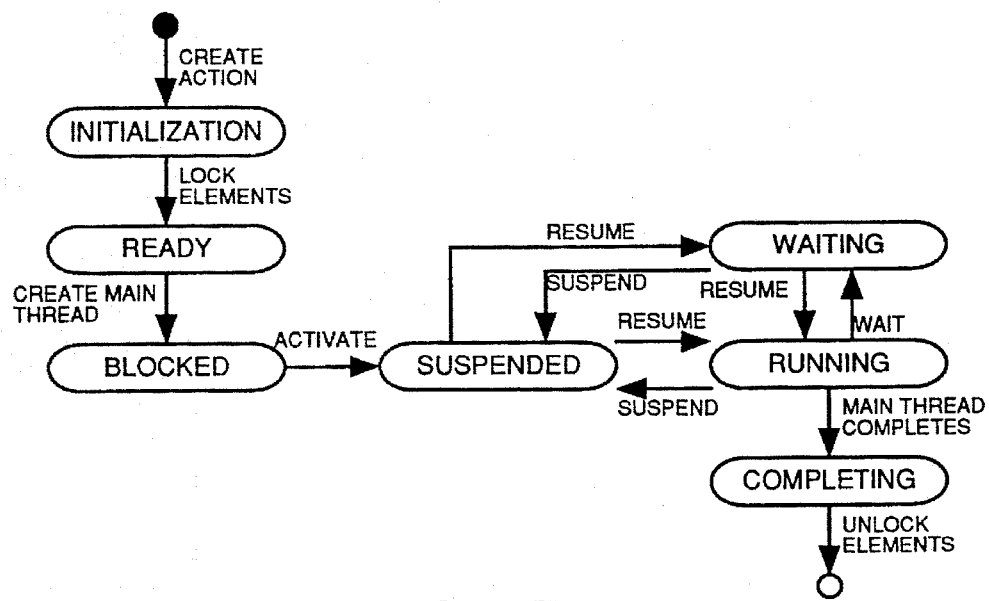
FIG. 11 is a state diagram for the step create action.

Queuing Actions. FIG. 11 is a diagram illustrating the Action flow. The background manager uses a queue of blocked actions and a list of active actions to coordinate threads. When the background manager creates actions, it places the actions in the blocked queue in FIFO order and creates a suspended thread to process the action. When all the elements are available, the background manager activates the action. To activate an action, the background manager moves the action from the blocked queue to the active queue. The active queue's order is base priority and then order activated. The background manager may temporarily override the priority of all actions, but the override priority should not affect the order actions are executing.

Previous requests for the same elements block an action depending on the type of access requested. An action with read access to an element blocks following actions requiring write access. An action with write access to an element blocks any following actions. An action blocked by a lower priority action will boost the blocking action to the priority of the blocked action. The background manager processes active actions in priority order. If there are more active actions than the system allows, the background manager will allow the actions at the top of the list to run and suspend the extra actions. A higher priority action can suspend a running action.

Actions can change from the blocked queue to active list only when created or when an action completes. The background manager places new actions at the end of the blocked queue and checks the action for blocking elements. If there are no blocking elements, the background manager releases the action and checks to make sure the top priority actions are executing. When an action completes, the background manager releases any actions no longer blocked and checks to make sure the top priority actions are executing.

Actions can change priority at any time. When the user increases the priority of an action, any actions blocking that action assume the new priority if it is higher than their old priority. The background manager resorts the active list after a priority change and then suspends and resumes the actions by priority. Actions moved to a lower priority go to the head of that priority since they stand a better chance of having resources allocated than other actions at that priority and get out of the system as quickly as possible. Actions moved to a higher priority go at the tail of that priority since they stand a worse chance of having resources allocated than other actions at that priority and wait for actions with resources allocated. If the background manager overrides or restores the base priority of all actions, it is not necessary to sort the active list or recheck the suspended and executing.

In the actual implementation, the two queues are merged into a single queue. The implementation functions the same as the two queue design. All runnable actions are placed at the head of the queue and blocked actions go at the tail of the queue. The runnable actions are in priority order. The blocked actions are in FIFO order. An action is activated as soon as no preceding actions have a lock that prevents the action from accessing elements. The activated action is moved up to its position in the runnable actions.

Priorities. Windows NT uses 31 priorities to schedule tasks. These priorities are 1 to 31 with 1 being the lowest priority. The base priority of a normal application is 9. The command thread will be at priority 9. The priority of background jobs should never be greater than that of the application or the user interface may become sluggish. Our system uses 5 priorities to order actions and set the underlying Windows NT priority. The following table maps the priorities we assign and the Windows NT priorities:

| Background Manager | Windows NT |
| --- | --- |
| 1 | 1 |
| 2 | 8 |
| 3 | 8 |
| 4 | 8 |
| 5 | 9 |

Priority 1 is for lowest priority actions. Priority 1 actions run only when no other tasks can use the processor. Priority 5 is for high priority actions. Priority 5 actions run at the same NT priority as our interactive system. Priorities 2 through 4 are for normal actions. The three priorities give the user control over the actions' order without affecting the NT priority. The default priority for actions is 3. Of course if another operating system is employed, suitable priorities may be employed.

Background/Foreground Processing. When the command system submits an action to the background manager, the background manager starts the action and waits for the action to complete. If the action is still processing after a brief time-out period, the background manager estimates the total time required to perform the action. If the action will require more than a user-defined amount of time to complete, the background manager puts up a dialog box to allow the user to push the action to background or to cancel the action. If the process gets pushed to background, the background manager adds the action to the summary dialog and returns. If the process is canceled, the background manager posts a cancel to the action and returns. If the action completes, the background manager deletes the dialog and returns. A system variable allows the user to push actions to the background without using the dialog box. If the action is blocked, the background manager immediately puts up a dialog to allow the user to push the action to the background or cancel it.

Action Startup. The Action Startup Sequence for calling the background manager in response to a create action command is shown below in pseudocode. The steps begin with a determination of whether the user has set the system in a mode where all tasks are automatically pushed to the background, or whether the user has chosen to have a dialog box presented to him. Next the system determines whether the action is blocked, and gives the user an option to add that task to the background tasks where the blocked task will execute as soon as the tasks blocking the desired task is complete. Finally, as shown by the pseudocode, a decision is made about the time to complete execution. If the time is too long, that is it exceeds the user delay threshold, for example, five seconds, then the user is given the option of pushing the task to the background.

```
Create Action
If "automatic push to background" is set
        Add action to background list
Else
        If action in blocked
                Ask user to "push to background" or "cancel"
                Wait for a response or action to complete
                If the action completed
                        Delete the dialog
                Else
                        If the response was "push to background"
                                Add the action to the background list
                        Else
                                Cancel the action
        Else
                Start action
                Wait for action completion
                If the wait timed out
                        Calculate time required
                        If the time required is too long
                                Ask user to "push to background" or
                                "cancel"
                                Wait for a response or the action to
                                complete
                                If the action completed
                                        Delete the dialog
                                Else
                                        If the response was "push to
                                        background"
                                                Add the action to back-
                                                ground list
                                        Else
                                                Cancel the action
```

Communication Between Subsystems. The background manager, command subsystem and processing subsystem must communicate to coordinate their actions. The command subsystem calls functions to access the background manager. In the preferred embodiment the background manager uses the Windows NT message system to respond to the command subsystem. The background manager sends two messages to the command system. The first message is that an action completed. The second message is that an action requires operator intervention to convention.

The background manager calls an processing function passed in by the command system. The processing subsystem calls background manager functions to create new threads, to close threads, to update the completion status and to notify the background manager of problems requiring operator intervention.

Figure 12:
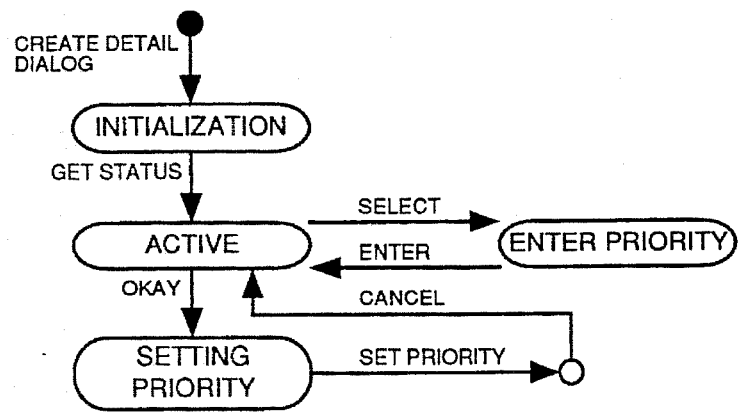
FIG. 12 is a state diagram for the step create detail dialog.
Figure 13:
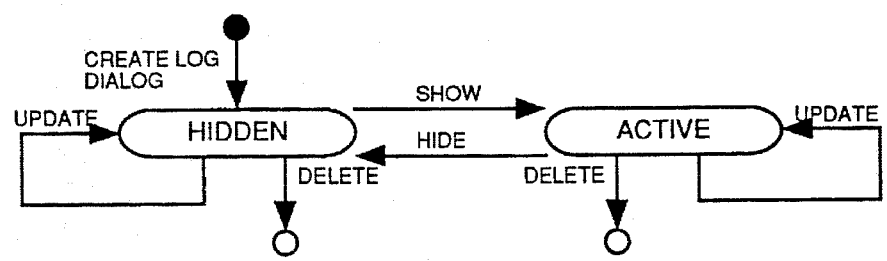
FIG. 13 is a state diagram for the step create log dialog.
Figure 14:
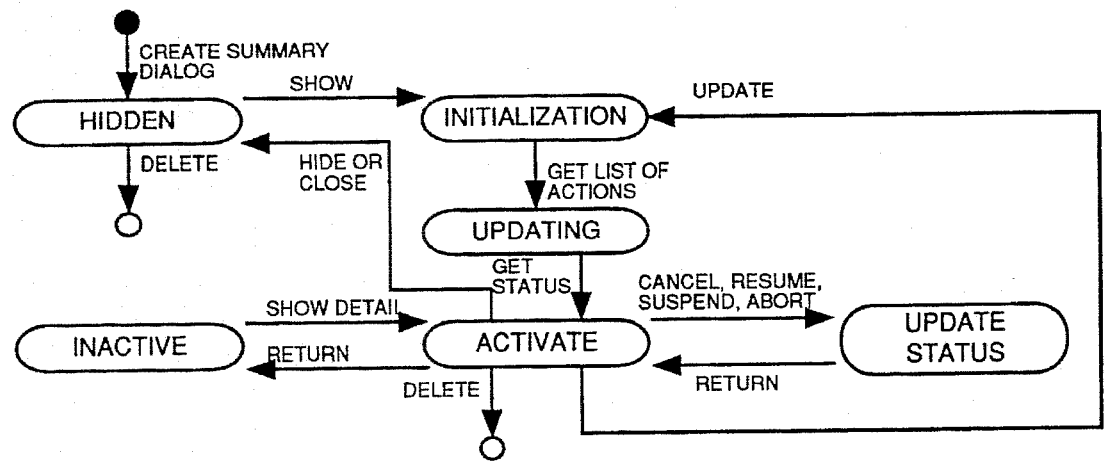
FIG. 14 is a state diagram for the step create summary dialog.

Dialog Boxes. The background manager contains four dialog boxes: detail, job, log and summary. FIG. 12 is a state diagram for the detail dialog, while FIG. 13 is a state diagram for the log dialog. FIG. 14 is a state diagram for the summary dialog. The summary and log dialog boxes are modeless. The background manager contains the log and summary dialog boxes in its instance data. The background manager hides the dialog boxes instead of deleting them on a close.

The detail and job dialog boxes are modal. The background manager creates these dialog boxes when needed and deletes the dialog boxes when closing them. The summary dialog box creates the detail dialog box when the user double-clicks on an action. The background manager creates the detail dialog box when the command subsystem requests the current information about the action on an element. The background manager creates the job dialog when the command subsystem requests it.

Error Recovery. The background manager must be able to recover from errors in the processing algorithms. Each action creates a wrapper function to start the main processing thread. In the preferred embodiment this function uses the Windows NT try-finally construct to trap errors.

Wrapper Function. A wrapper function is used around each main thread. The wrapper function handles error recovery by executing the main thread within a try-finally construct. The wrapper handles action cleanup from a normal exit, an processing error or a cancel. The wrapper also handles ringing the alarm, posting to the log dialog and posting to the command subsystem when an action completes.

Figure 15:
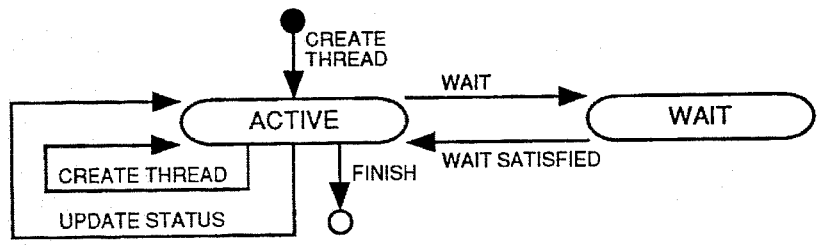
FIG. 15 is a state diagram for the step create thread.

Guaranteeing Thread Safety. A thread must acquire the background manager mutex to access an action or the override priority. The background manager creates the mutex at initialization and destroys it in its destructor. Each thread opens a connection to the mutex. The thread waits until it acquires the mutex, accesses the data and releases the mutex. FIG. 15 is a state diagram for threads.

Each access to an object in the background manager subsystem goes through the background manager object. The background manager acquires the mutex and then calls a method on the action. The routine must release the mutex before returning. The background manager provides an api for each operation on an action or dialog. An exception to this is the image processing subsystem directly calls the action method to update the percent complete indicator.

Thread Completion Alarm. Each action can have an alarm attached. The alarm goes off when the action completes. The alarm can be a beep, a message in the status bar, or a dialog box. Each created action takes the background manager or queue default setting. The user overrides the alarm for each action using the detail dialog. The user changes the default setting using the background manager options or queue options dialogues.

Figure 16:
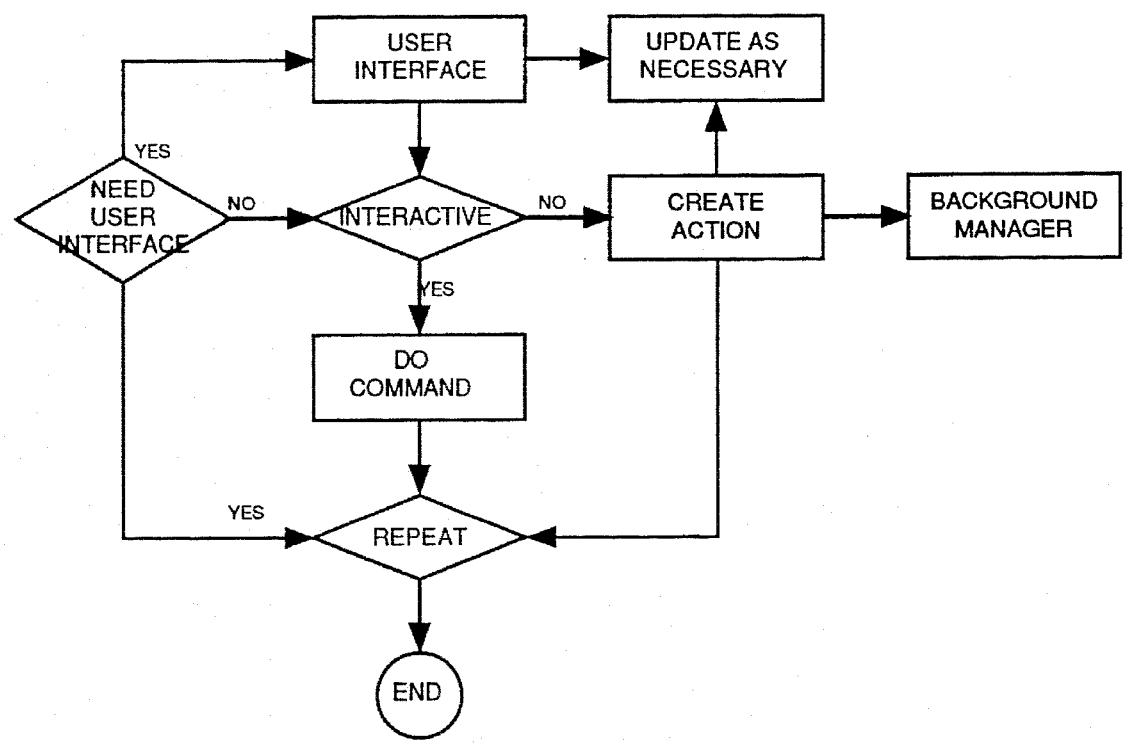
FIG. 16 is a diagram illustrating the functional operation to assign a task to the background manager.

FIG. 16 is a flowchart illustrating the overall command processing operation, and the functional operation which places a command into the background manager. As shown in FIG. 16, the user interface is updated as necessary. Commands from the user interface are screened to determine whether they are interactive or not. Those commands which are not interactive are immediately performed, as shown by the Do Command step. Those commands which are not interactive, for example, reformatting in graphical image, are a source of created action. After the action is created and supplied to the background manager, the user interface is updated and a determination is made whether or not the steps need to be repeated. If the steps are not repeated, the sequence ends. If the steps are to be repeated, then control is returned to the user interface, if necessary.

Figure 17:
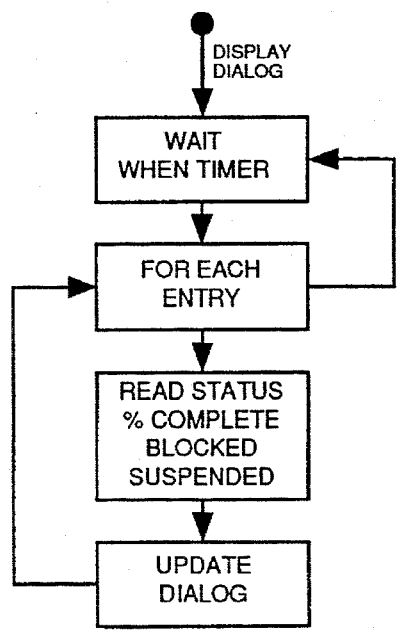
FIG. 17 is a diagram illustrating the timer operation in a dialog box.

FIG. 17 is a diagram illustrating the timer aspects of the background manager. Commands are first given to a timer. As described above, when the operation cannot be completed within the user tolerance, a dialog box is displayed to the user. Thus, for each action, the status of that action is read and the percentage completion determined. Those actions which are blocked are also determined. The dialog box is updated using this information, and control is returned to before each action step.

Figure 18:
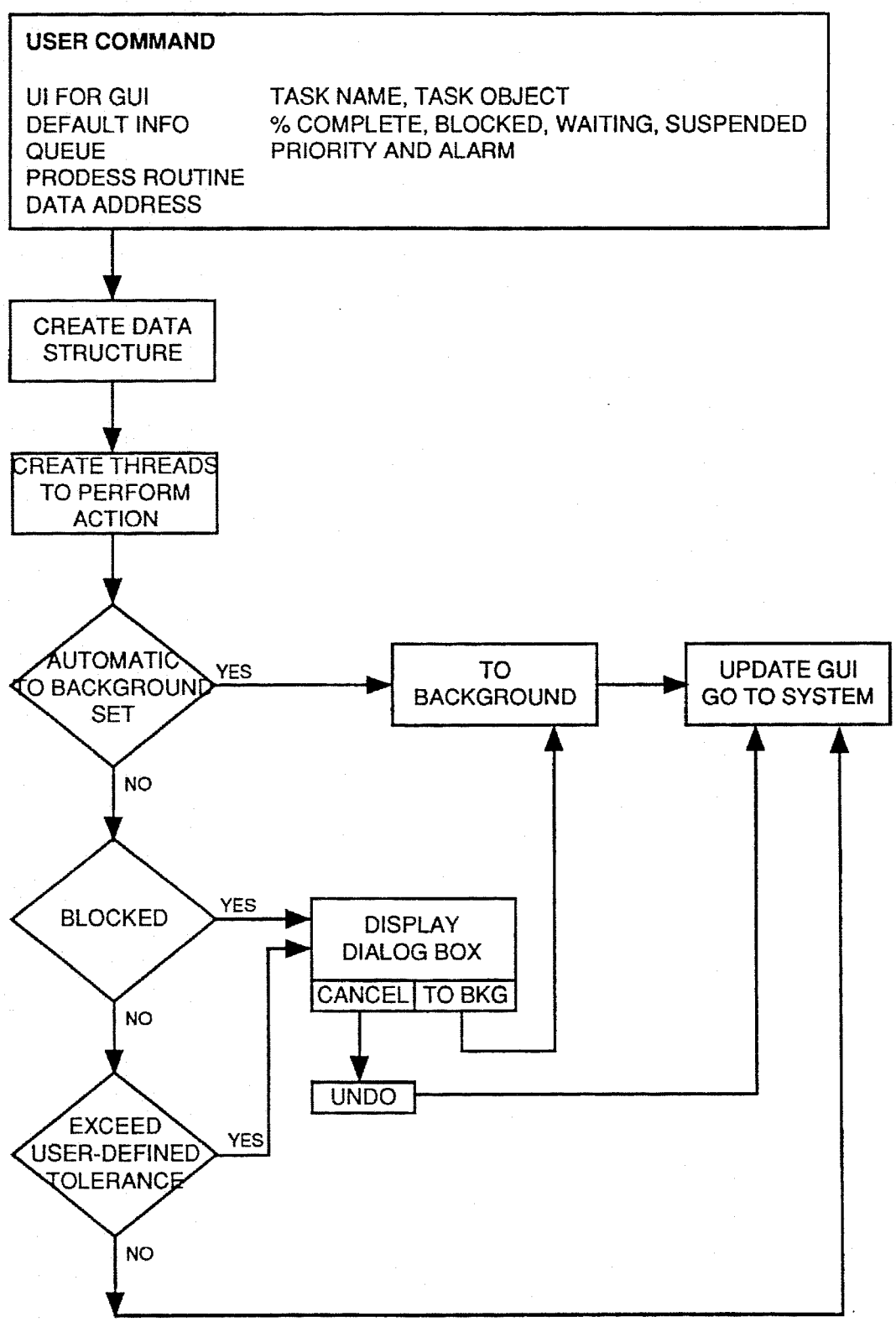
FIG. 18 is a diagram illustrating the information inherent in a user command and the assignment of that command to the background processor.

FIG. 18 is a diagram illustrating in greater detail the operations which occur when a user command is sent to the background. As shown in FIG. 18, a user command carries with it a large amount of information. For example, the user command includes user interface information for the graphical user interface used to control the computer system. This information includes the task name and the task object. Additional information is determined, including the percentage of the task which has been completed, whether it is blocked or not, whether it is awaiting execution or not, and whether the task has been suspended.

Also supplied is queue information which determines the default priority and alarm information. This queue information is determined by the application program and is indicative of the load a task places on the system. Finally, the address of code to be executed by the command and the information that code needs, in the form of an address for the data, are also supplied. The command results in the creation of a data structure, and the creation of threads to perform the action. As shown in FIG. 18, an initial determination is made about whether the action should always be sent to the background. If the action does not require approval before being sent to the background, the action is pushed to background, the user interface is updated and control returns to the system. If the action requires approval, a determination is made to see if the action is blocked. If the action is blocked, the dialog box is presented, offering the user the opportunity to either cancel the task or push it to the background. In case of cancellation, an undo operation is performed and the GUI is updated. If the action is unblocked, the dialog box changes from the state shown in FIG. 3 to the state shown in FIG. 2. If the action completes before being pushed to the background, the dialog is deleted and control returns to the system. Of course, if the user selects to push the task to the background, then the task is pushed to the background. Once in the background, the user interface is updated and control is returned to the system.

If the action is not blocked, the background manager accurately estimates the time required for the action to complete. If the action will complete within the user-defined tolerance time interval, the action runs to completion and control returns to the system. If the action is estimated to take longer than the user-defined tolerance time limit, the dialog shown in FIG. 2 is displayed to the user to cancel the action or send it to the background. In case of cancellation, an undo operation is performed and GUI is updated. If the user selects to push the action to background, the task is sent to the background, the user interface is updated, and control is returned to the system. This possibility is expressed in FIG. 18 by the wait label.

Figure 19:
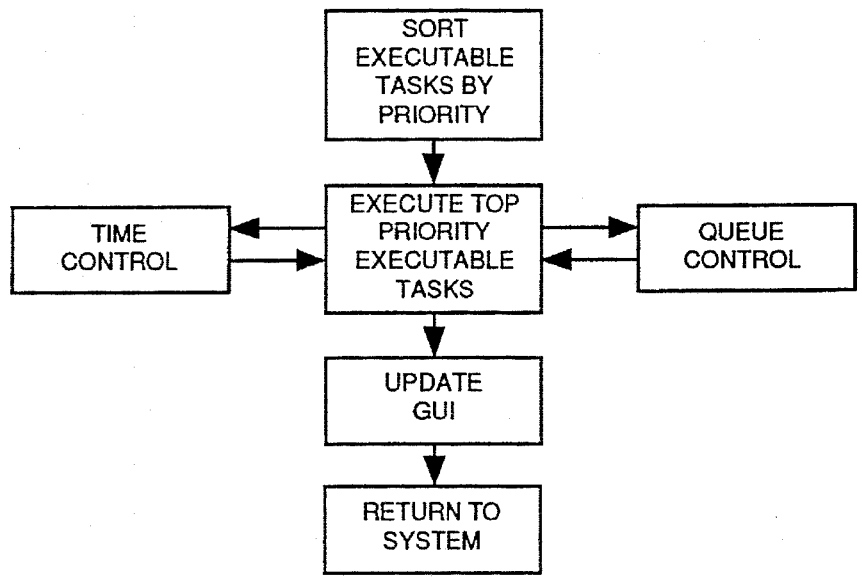
FIG. 19 is a diagram illustrating the internal operation of the background manager in executing a task.

FIG. 19 is a diagram illustrating the background processing. As shown in FIG. 19, once a task is not blocked, it is sorted by priority. Then the top priority runnable tasks are executed. The user has defined the priorities in the background options and queue options dialog boxes. The execution is continuously under control of a queue control and time control. Time control is described in conjunction with FIG. 20. The queue control has allowed the user to queue tasks in order and assign priorities. As the background manager executes the task, the user interface is updated, and upon task completion control is returned to the system.

Figure 20:
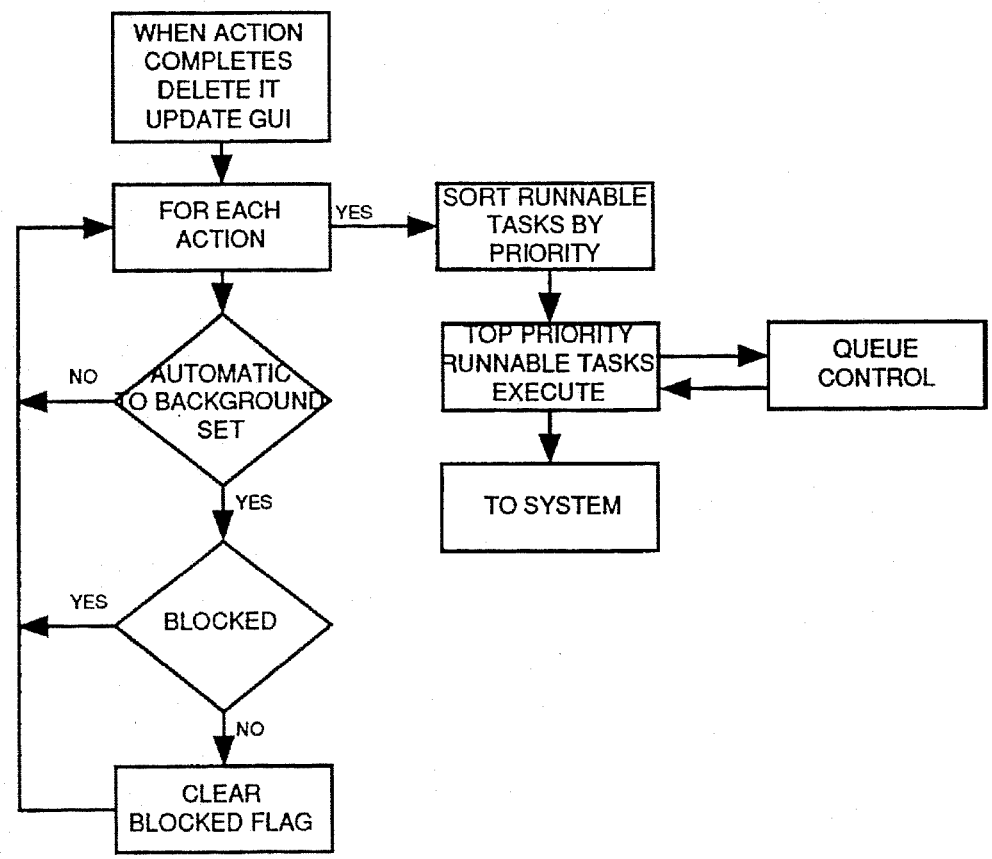
FIG. 20 is a diagram illustrating the operation of the background manager when an action is completed.

FIG. 20 illustrates the operations performed when an action is completed. For those actions which cannot be executed due to a blocked flag being set, a check is made upon the completion of each action as to whether the blocked flag is still set. Eventually, the blocked flag will be cleared, and that action will be sorted and assigned execution based on its priority. A resorting of the actions awaiting execution is performed by priority. The top priority tasks then begin execution under the control of the background manager or queue control.

FIGS. 21–29 are diagrams illustrating one example of the functioning of the background manager. These figures illustrate the design by showing how the background manager coordinates a series of actions. The sequence of actions is print, create HLS mask (a specific command for a graphics system), convert file, gradation, fill, change priorities and clone. Review pixel is executing. These actions are on the same raster at the same initial priority.

Figure 21:
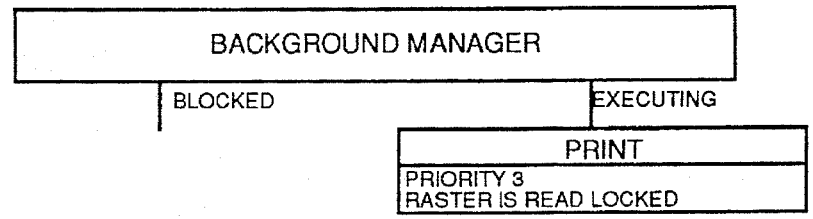
FIGS. 21–29 illustrate one example of how the background manager coordinates a series of actions, with FIG. 21 illustrating a print command, FIG. 22 illustrating a create mask command, FIG. 23 illustrating a convert file command, FIG. 24 illustrating a gradation command, FIG. 25 illustrating a fill command, FIG. 26 illustrating a user change of priorities, FIG. 27 illustrating the resulting change in priorities, FIG. 28 illustrating further rearrangement of the priorities, and FIG. 29 illustrating the completion of the actions.

FIG. 21 illustrates the print command in this example. Print is a deferred read command. The action starts after the user selects the printer. The background manager puts a read lock on the raster. This action starts processing immediately.

Figure 22:
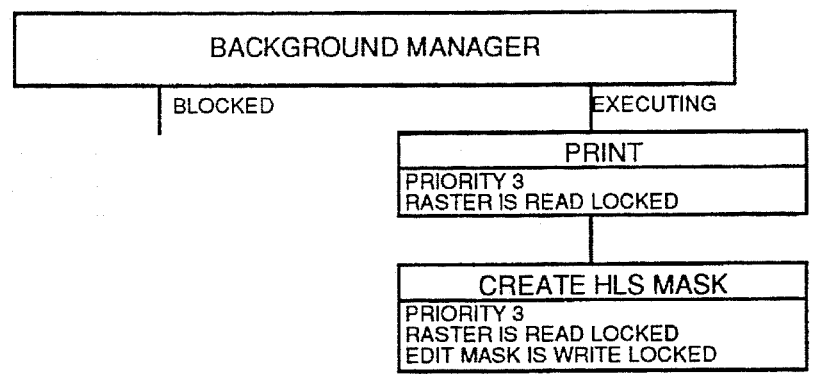

FIG. 22 is a diagram illustrating the effect of the Create HLS Mask command. Create HLS mask is a deferred write to the edit mask requiting read access to the raster. The action starts after the user selects the HLS parameters and hits Okay. The action puts a read lock on the raster and a write lock on the edit mask. Review pixel is turned off for the edit mask for the duration of this command. This action starts processing immediately.

Figure 23:
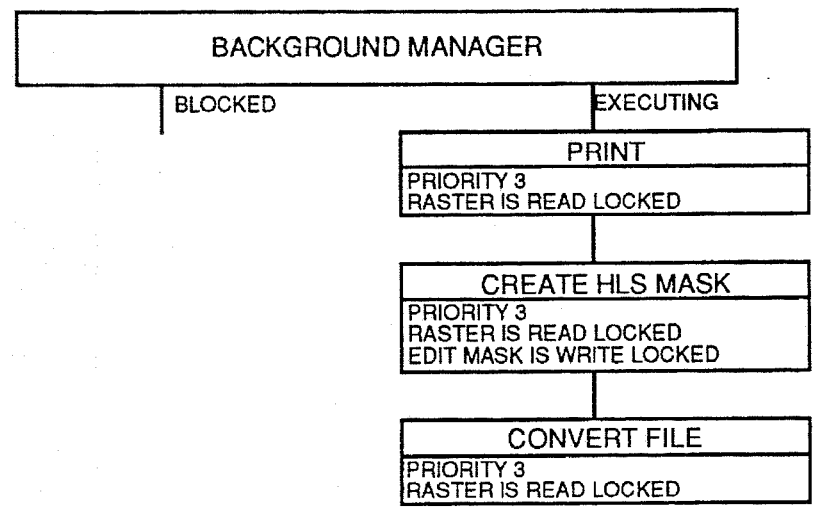

FIG. 23 is a diagram illustrating the effect of the Convert File command. Convert file is a deferred read. The action starts after the user selects the destination file. The action puts a read lock on the raster and a write lock on the new file. This action starts processing immediately.

Figure 24:
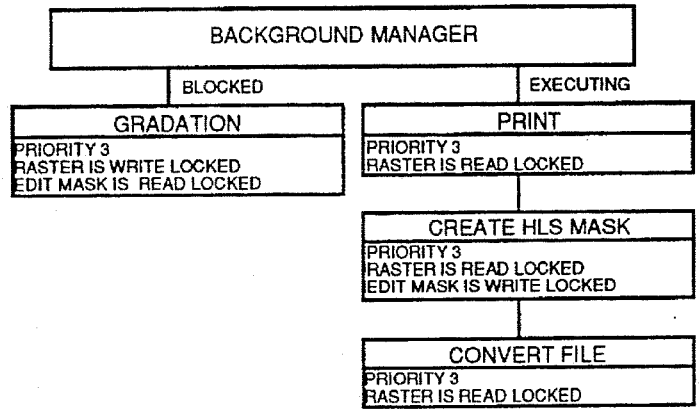

FIG. 24 is a diagram illustrating the effect of the Gradation command. Gradation is a deferred write with visual simulation. The command requires read access to the raster. The command simulates the result. The action staffs after the user sets the gradation parameters and hits Okay. The action is blocked until the print, create HLS mask and convert file complete. Review pixel is turned off for the raster for the duration of this command.

Figure 25:
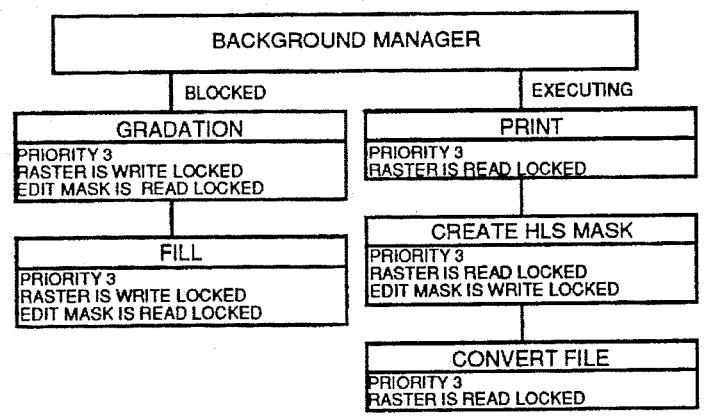

FIG. 25 is a diagram illustrating the effect of the Fill command. Fill is a deferred write. The action starts after the user sets the translucency and chooses to proceed. The action is blocked until all previous actions for this raster complete. Review pixel is turned off for the raster for the duration of this command.

Figure 26:
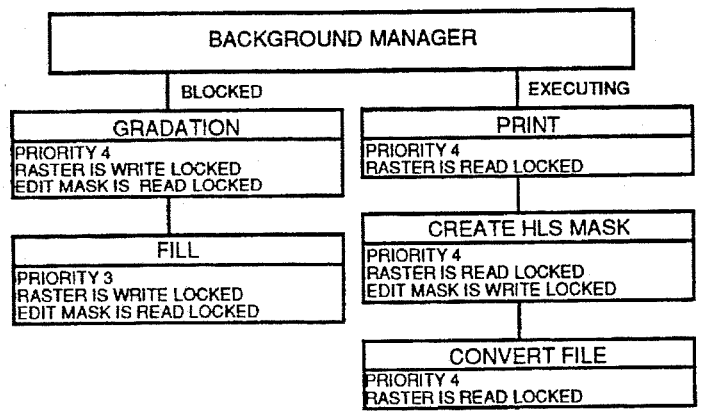

FIG. 26 is a diagram illustrating the effect of the Change Priorities command. The user raises the priority of the gradation command to 4. The gradation command depends on the previous actions completing before it can start; therefore, the previous actions take priority 4. The gradation command is still blocked.

Figure 27:
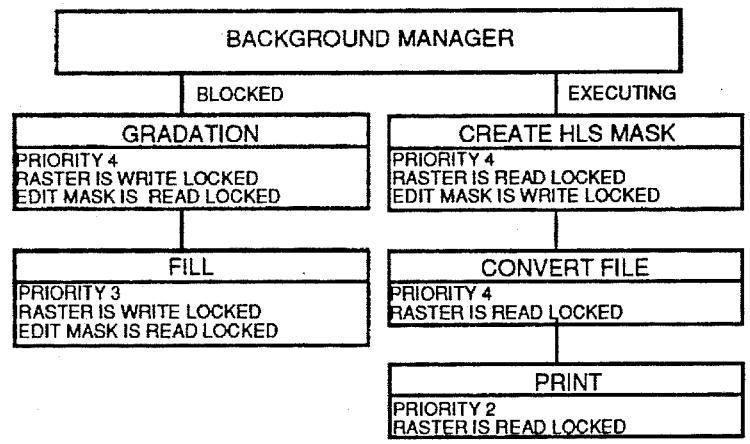

As shown in FIG. 27 the user then sets the print priority to 2. Lower priorities are not passed down to blocked actions. The print action is moved to the end of the list of executing actions.

Figure 28:
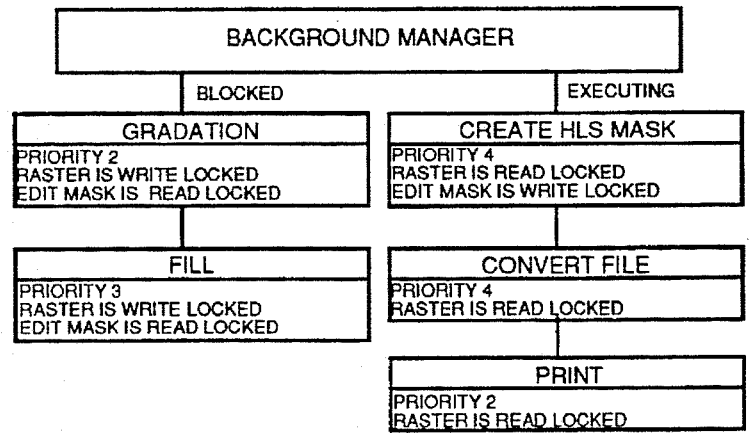

FIG. 28 shows the effect of the user then setting the gradation priority to 2. The blocked queue is in FIFO; therefore, the gradation action still blocks the fill command.

Figure 29:
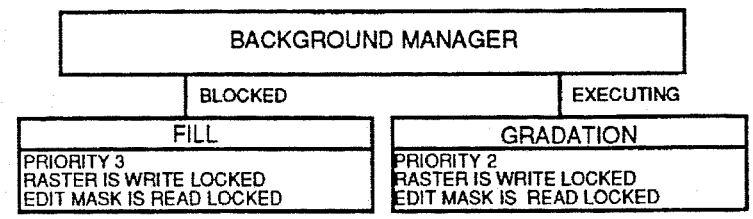

FIG. 29 is a diagram illustrating the Actions Complete. When the create HLS mask, convert file and print actions complete, the gradation command begins executing. The fill action remains blocked until the gradation completes.

Below we describe an example of a queue. Assume the background manager is configured to allow a maximum of four tasks to execute simultaneously. Assume queue 1 is designated for tasks which place a very heavy load on the input/output system. This queue is configured to allow only one task to process within the queue at any time. Also assume queue 2 is designated for tasks which place a very heavy load on the system's memory. This queue is configured to allow up to two tasks to process simultaneously.

Now assume the following set of six tasks are submitted before any task completes. None of the example tasks cause data conflicts. The first task is a typical background task so it is not submitted to a specific queue. The second task places a large load on the i/o system so it is submitted to queue 1. The third task requires a good deal of memory. This task is placed in queue 2. The first three tasks begin executing as soon as they are submitted. The fourth task again places a large load on the i/o system and is placed in queue 1. This task may not begin executing until it is the highest priority task within queue 1.

The fifth task is another typical task. This task begins executing immediately. The sixth task goes into queue 2. This task cannot execute because the overall limit for concurrent tasks has been reached. The figure below illustrates the state of the system.

| Task | Queue | Priority | Status |
|---|---|---|---|
| 1 | None | Normal | Running |
| 2 | 1 | Normal | Running |
| 3 | 2 | Normal | Running |
| 4 | 1 | Normal | Waiting on higher priority task in queue 1 |
| 5 | None | Normal | Running |
| 6 | 2 | Normal | Waiting on all higher priority tasks |

The order of tasks can be changed within the system and within a queue. For example, task 4 from the previous example could be given high priority. This task would move to the top of the list of tasks and task 2 would be suspended. The figure below illustrates the state of the system after changing the priority of task 4.

| Task | Queue | Priority | Status |
|---|---|---|---|
| 4 | 1 | High | Running |
| 1 | None | Normal | Running |
| 2 | 1 | Normal | Waiting on higher priority task in queue 1 |
| 3 | 2 | Normal | Running |
| 5 | None | Normal | Running |
| 6 | 2 | Normal | Waiting on all higher priority tasks |

As has been described above, the usable concurrent functionality of our system provides a software architecture that allows an application's capacity to scale in proportion to additional or more powerful CPUs. This aspect allows software to remain meaningful over the evolution of computer architectures of the foreseeable future. It also allows an application to perform more productively than applications that do not use the usable concurrent functionality design. With usable concurrent functionality, the software application exploits concurrency in a manner that is "smart" enough to allow the user to work ahead of the computer in a meaningful and usable way.

DEFINITIONS

As used herein the following terms have the meanings described below, unless the context of usage suggests otherwise.

Action—a thread or collection of related threads to process an element or set of elements. The user interface to all processing is in terms of actions. Completing actions notify the log dialog. Actions track their percentage complete, priority, status and processing time. Each action is a member of a job and contains a description about what it is doing. At creation, the action locks affected elements and creates a main thread to process those elements. The main thread deletes the action when it completes.

Background manager—the component that coordinates all actions for the system. The background manager creates actions and manages action queues based on the elements involved, action type. The background manager preferably contains a detail dialog, a summary dialog and a log dialog.

Command system—collects input from the user about an action, initiates the action, suspends and resumes all actions and displays or hides background manager dialogues.

Detail dialog—the user interface to a single action. This dialog provides all information known by the background manager about a process. Information displayed through this dialog includes: action description, elements, percentage complete, priority, job, status and processing time. The detail dialog explains any block on an action. The user changes the priority of the selected action.

Element—a raster or vector object required for an action. Each background manager element is connected to an appropriate object and specifies the type of lock on that element.

Job—a series of actions to accomplish a task. The job accumulates job tracking information for billing purposes. Each job has a description of the task.

Job dialog—the user interface to create or delete jobs. The system creates the job dialog only when needed. The job dialog cannot delete jobs referenced by any queued or active actions.

Log dialog—the user interface to completed actions. This dialog box maintains a list information about completed actions including: action description, elements, job, completion status (normal, canceled, error) and processing time required. A filter allows the user to view all actions or only those which terminated abnormally. Another filter allows the user to view all jobs or only a selected job.

Summary dialog—the user interface to all active actions. This dialog box displays information about all active actions such as: action description, percentage complete, priority and execution status. This dialog cancels, suspends or resumes actions.

Thread—a sequence of instructions processing an image. Threads communicate with actions to create and terminate additional threads while processing an element.

User—the controller of all tasks within the system. The user sends commands to the command system to start actions and to display dialogues. The user controls executing actions through the background manager dialogues.

Queue—a subset of actions within the background manager. Queues provide an ability to limit the number of concurrent actions of a given type. If a type of action is expected to take a large amount of system resources, that type could be assigned to a queue which limits the number of concurrent actions within the queue to one (or some other user chosen low number). Actions within the queue execute only if they are the top priority actions and the number of concurrent actions within the queue has not been reached.

What is claimed is:

1. A method of enabling a user of a computer system to control the execution of tasks by an application program on the system comprising:

establishing for the application program a user tolerance level consisting of the time period that a user is willing to wait for the execution of a task;

whenever the user requests the system to perform a task, calculating an estimate of the time the task will require to be completed;

if the estimate is less than the user tolerance level, then performing the task;

if the estimate is greater than the user tolerance level then allowing the user to assign the task to a background processing operation; and returning control of the system to the user for selection of another task.

2. A method as in claim 1 wherein the step of assigning the task to a background processing operation comprises placing the task under control of a background processing manager for execution in accordance with a priority.

3. A method as in claim 2 wherein the step of "if the estimate is greater than the user tolerance level then allowing the user to assign the task to a background processing operation" comprises presenting a dialog box on a screen visible to the user to allow the user to choose whether to cancel the task or to send the task to a queue for execution under control of the background processing manager.

4. A method as in claim 3 wherein the step of "to send the task to a queue for execution under control of the background processing manager" comprises:

placing the task in a queue;

determining if the task requires access to information which is not yet available to it;

if the task requires such information then delaying execution of the task until such information is available; and if the task does not require such information then executing the task when the task has a highest priority for execution.

5. A method as in claim 1 wherein the step of "if the estimate is greater than the user tolerance level then allowing the user to assign the task to a background processing operation" comprises presenting a dialog box on a screen visible to the user to allow the user to choose whether to cancel the task or to send the task to a queue for execution under control of a background processing manager.

6. A method as in claim 5 wherein the step of "to send the task to a queue for execution under control of the background processing manager" comprises:

placing the task in a queue;

determining if the task requires access to information which is not yet available to it;

if the task requires such information then delaying execution of the task until such information is available; and if the task does not require such information then executing the task when the task has a highest priority for execution.

7. A method as in claim 1 further comprising before the step of "whenever the user requests the system to perform a task, calculating an estimate of the time the task will require to be completed" a step of determining whether the user has chosen to send all tasks to the background, and based on that determination sending the task to the background without determining the user tolerance time period.

8. A method as in claim 1 further comprising displaying to the user an indication of the extent to which the task has been completed.

9. A method of enabling a user of a computer system to control execution of a plurality of tasks generated by an application program on the computer system, the method comprising the steps of:

maintaining a list of tasks awaiting completion of execution by the computer system;

displaying the list of tasks to the user on a display;

in response to displaying the list of tasks, having the user prioritize the list of tasks to thereby determine which tasks will be completed first.

10. A method as in claim 9, wherein the step of displaying the list of tasks comprises displaying the list of tasks in a user interface on the display; and wherein the step of having the user prioritize the list of tasks comprises prioritizing the list of tasks using a pointing device and the user interface.

11. A method as in claim 9, further comprising the step of:

in response to displaying the list of tasks, having the user suspend one task from the list of tasks.

12. A method as in claim 9, further comprising the step of:

in response to displaying the list of tasks, having the user abort one task from the list of tasks.

13. A method as in claim 9, wherein the list of tasks includes a queue, the queue having a number of concurrent tasks.

14. A method as in claim 9, further comprising the steps of:

selecting one task of the list of tasks; and displaying any tasks to be completed before the one task is executed.

15. A method as in claim 9, wherein the step of displaying the list of tasks comprises displaying a name, a description, and a percentage completion for each task in the list of tasks.

16. A method as in claim 9, further comprising the step of notifying the user when a task from the list of tasks is complete.

17. A computing system for enabling a user to control the execution of tasks from an application program, the computing system comprising:

a command system for accepting commands from the application program and outputting commands which instruct the computing system to carry out operations;

a background manager coupled to the command system for intercepting at least some of the commands from the command system and when so instructed by the user, placing the at least some of the commands in a queue for execution at a subsequent time; and a processing system coupled to the command system and to the background manager for receiving commands from the command system and from the background manager and in response thereto carrying out operations.

18. A computing system as in claim 17, further comprising:

a user input device coupled to the background manager, the user input device for receiving user instructions and for outputting the user instructions to the background manager.

19. A computer system as in claim 18 wherein the user input device comprises a user interface on a display and a pointing device.

20. A computer system as in claim 17, further comprising means for estimating a time for execution for each of the at least some of the commands.

21. An apparatus for enabling a user of a computer system to control the execution of tasks generated by an application program, the computer system comprising:

means for establishing a user tolerance level for the application program, the user tolerance level comprising a period of time that the user is willing to wait for the execution of a task;

means for calculating an estimate of the time the task will require to be completed whenever the user requests the system to perform a task;

means for performing the task, when the estimate is less than the user tolerance level, then performing the task;

means allowing the user to assign the task to a background processing operation when the estimate is greater than the user tolerance level then; and means for returning control of the computer system to the user for selection of another task.

22. An apparatus as in claim 21 wherein the means for allowing the user to assign the task comprises:

means for presenting a dialog box on a screen visible to the user to allow the user to choose whether to cancel the task; and means for allowing the user to send the task to a queue for execution under control of a background processing manager.

23. An apparatus as in claim 22 wherein the means for allowing the user to send the task to a queue comprises:

means for placing the task in a queue;

means for determining if the task requires access to information which is not yet available to it;

means for delaying execution of the task until such information is available when the task requires such information; and means for executing the task when the task has a highest priority for execution.

24. An apparatus as in claim 21 wherein the means for allowing the user to assign the task comprises means for placing the task under control of a background processing manager for execution in accordance with a priority.

25. An apparatus as in claim 21 further comprising:

means for determining whether the user has chosen to send all tasks to the background; and means for sending the task to the background without determining the user tolerance time period based on that determination.

26. An apparatus as in claim 21 further comprising means for displaying to the user an indication of the extent to which the task has been completed.

27. A computer system for enabling a user of a computer system to control execution of a plurality of tasks generated by an application program, the computer system comprising:

a display;

means for maintaining a list of tasks awaiting completion of execution by the computer system;

means for displaying the list of tasks to the user on the display; and means for having the user prioritize the list of tasks to thereby determine which tasks will be completed first.

28. A computer system as in claim 27, wherein the means for displaying the list of tasks comprises means for displaying the list of tasks in a user interface on the display; and wherein the means for having the user prioritize the list of tasks comprises means for prioritizing the list of tasks using a pointing device and the user interface.

29. A computer system as in claim 27, further comprising:

means for having the user suspend one task from the list of tasks on the display.

30. A computer system as in claim 27, further comprising:

means for having the user abort one task from the list of tasks on the display.

31. A computer system as in claim 27, further comprising the steps of:

means for selecting one task of the list of tasks; and means for displaying any tasks to be completed before the one task is executed.

32. A computer system as in claim 27, wherein the means for displaying the list of tasks comprises means for displaying a name, a description, and a percentage completion for each task in the list of tasks.

33. A computer system as in claim 27, further comprising means for notifying the user when a task from the list of tasks is complete.

* * * * *